United States Patent
Stephan et al.

(10) Patent No.: US 10,024,580 B2
(45) Date of Patent: Jul. 17, 2018

(54) CORNER CONNECTION BRACKET FOR SOLAR ENERGY PANELS

(71) Applicant: Pegasus Solar Inc., San Jose, CA (US)

(72) Inventors: Erich Kai Stephan, Newport Beach, CA (US); Glenn Harris, Sausalito, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 512 days.

(21) Appl. No.: 14/602,045

(22) Filed: Jan. 21, 2015

(65) Prior Publication Data
US 2015/0204583 A1    Jul. 23, 2015

Related U.S. Application Data

(60) Provisional application No. 61/930,420, filed on Jan. 22, 2014.

(51) Int. Cl.
*F16B 1/00*    (2006.01)
*F24J 2/52*    (2006.01)

(52) U.S. Cl.
CPC .............. *F24J 2/5262* (2013.01); *Y02B 10/20* (2013.01); *Y02E 10/47* (2013.01); *Y10T 403/7073* (2015.01); *Y10T 403/75* (2015.01)

(58) Field of Classification Search
CPC .......... H02S 30/10; H02S 20/20; H02S 20/30; F24J 2/5262; F24J 2/526; F24J 2/5252; F24J 2/5254; Y02E 10/47; Y02B 10/20; Y10T 403/7073; Y10T 403/75
See application file for complete search history.

(56) References Cited

U.S. PATENT DOCUMENTS

| | | | | |
|---|---|---|---|---|
| 3,926,529 A | * | 12/1975 | Brooks | .................... F16B 12/24 16/270 |
| 4,101,101 A | * | 7/1978 | Barkats | .................. F24J 2/5211 136/245 |
| 4,464,073 A | | 8/1984 | Cherry | |
| 4,729,197 A | | 3/1988 | Miller | |
| 4,838,951 A | * | 6/1989 | Riermeier | ................ F24J 2/464 126/623 |
| 4,850,081 A | * | 7/1989 | Grant | ........................ E05D 1/04 16/257 |

(Continued)

FOREIGN PATENT DOCUMENTS

| CN | 2845174 | 12/2006 |
|---|---|---|
| CN | 2862330 | 1/2007 |

(Continued)

OTHER PUBLICATIONS

Machine_translate_EP0200050 by Riermeier Manfred (Year: 1986).*

(Continued)

*Primary Examiner* — Babajide A Demuren
(74) *Attorney, Agent, or Firm* — Polsinelli LLP (57) ABSTRACT

Solar panel connection assemblies for mounting solar energy panels to buildings as well as for affixing multiple solar energy panels together. Solar panel corner connection assemblies including a bracket that can be fastened to the corner edge of solar panel frames. Solar panel corner connection assemblies including flanges extending from the corner of a bracket for connecting with a neighboring flange on a neighboring bracket.

16 Claims, 9 Drawing Sheets

(56) References Cited

U.S. PATENT DOCUMENTS

| | | | |
|---|---|---|---|
| 5,709,500 | A | 1/1998 | Mizelle et al. |
| 5,746,029 | A | 5/1998 | Ullman |
| 6,158,087 | A | 12/2000 | Cheung |
| 6,360,491 | B1 | 3/2002 | Ullman |
| D547,262 | S | 7/2007 | Ullman |
| 7,406,800 | B2 | 8/2008 | Cinnamon et al. |
| 7,487,771 | B1 | 2/2009 | Eiffert et al. |
| 7,592,537 | B1 | 9/2009 | West et al. |
| 7,762,027 | B1 | 7/2010 | Wentworth et al. |
| 7,832,157 | B2 | 11/2010 | Cinnamon et al. |
| 7,861,485 | B1 | 1/2011 | Wentworth et al. |
| 7,866,098 | B2 | 1/2011 | Cinnamon et al. |
| 7,895,808 | B1 | 3/2011 | Wentworth et al. |
| 7,905,064 | B1 | 3/2011 | Wentworth et al. |
| 7,987,641 | B2 | 8/2011 | Cinnamon et al. |
| 8,092,129 | B2 | 1/2012 | Wiley et al. |
| 8,109,048 | B2 | 2/2012 | West et al. |
| 8,153,700 | B2 | 4/2012 | Stearns et al. |
| 8,166,713 | B2 | 5/2012 | Stearns et al. |
| 8,266,847 | B2 | 9/2012 | Edgar |
| D673,903 | S | 1/2013 | Kobayashi |
| 8,353,650 | B2 | 1/2013 | Wiley et al. |
| 8,375,654 | B1 | 2/2013 | West et al. |
| 8,505,248 | B1 | 8/2013 | Leong et al. |
| 8,608,418 | B2 | 12/2013 | Wiley et al. |
| 8,640,400 | B2 | 2/2014 | Liebendorfer |
| 8,756,881 | B2 | 6/2014 | West et al. |
| D710,792 | S | 8/2014 | Cai et al. |
| 8,813,460 | B2 | 8/2014 | Cinnamon et al. |
| 8,875,455 | B1 | 11/2014 | Yang et al. |
| D719,084 | S | 12/2014 | Kruse |
| 8,990,979 | B1 * | 3/2015 | Craver ............... A47C 19/005 5/400 |
| 2006/0005875 | A1 | 1/2006 | Haberlein |
| 2007/0223993 | A1 | 9/2007 | Peterson, Jr. et al. |
| 2011/0194886 | A1 | 8/2011 | Wu et al. |
| 2011/0259404 | A1 * | 10/2011 | Jang ................. H02S 30/10 136/251 |
| 2012/0036807 | A1 | 2/2012 | Pacione et al. |
| 2013/0074909 | A1 * | 3/2013 | Sheng ............... H01L 31/042 136/251 |
| 2013/0175231 | A1 | 7/2013 | Klinga et al. |
| 2014/0169909 | A1 | 6/2014 | Wiley et al. |
| 2014/0352763 | A1 | 12/2014 | Chen et al. |

FOREIGN PATENT DOCUMENTS

| | | | |
|---|---|---|---|
| CN | 201655815 | 11/2010 | |
| CN | 102709369 | 10/2012 | |
| CN | 102881681 | 1/2013 | |
| CN | 102956728 | 3/2013 | |
| DE | 3611542 | 10/1987 | |
| DE | 102006053830 B3 * | 2/2008 | ............ F24J 2/5211 |
| EP | 0200050 | 11/1986 | |
| EP | 2590225 | 5/2013 | |
| PL | WO 2013157966 A1 * | 10/2013 | ............ E04B 7/063 |

OTHER PUBLICATIONS

International Search Report and Written Opinion—PCT/US2015/012526—ISA/EPO—dated Apr. 10, 2015.

International Search Report and Written Opinion for PCT Application No. PCT/US2015/023343, dated Jul. 13, 2015, 6 pages.

Extended European Search Report from the European Patent Office for European Patent Application No. EP15740408.8, dated May 18, 2017, 7 pages.

Machine generated English translation of the 1st Office Action and Search Report, dated Dec. 13, 2017, 14 pages, from the State Intellectual Property Office of People's Republic of China for corresponding Chinese Patent Application No. 201580005062.4.

* cited by examiner

CORNER CONNECTION BRACKET FOR SOLAR ENERGY PANELS

CROSS-REFERENCE TO RELATED APPLICATIONS

The present application is claiming priority of U.S. Provisional Patent Application Ser. No. 61/930,420 entitled "CORNER CONNECTION BRACKET FOR SOLAR ENERGY PANELS", filed on Jan. 22, 2014, the content of which is herein incorporated by reference.

BACKGROUND

1. Technical Field

The present disclosure relates to solar panel assemblies and more specifically to solar panel corner connection assemblies.

2. Introduction

Solar energy panels are becoming more popular as a means to produce electricity. In many scenarios, the solar energy panels are installed on a framed structure such as a building rooftop. Some existing attempts at mounting solar energy panels to a rooftop have required a long beam of metal, often called a rail, that is used to structurally support multiple solar energy panels together and to structurally connect the solar energy panels to the greater building or structure.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As explained above, known methods of installing solar panels require a large amount of time and excessive amounts of material. Accordingly, the present technology involves connection assemblies for solar panels that address the deficiencies in the known art. Some embodiments of the present technology involve connection assemblies for mounting solar energy panels to buildings as well as for affixing multiple solar energy panels together. The connection assemblies of the present technology reduce material while maintaining the requisite structural integrity of a system of solar panels.

Some embodiments of the present technology involve solar panel connection assemblies that include a bracket having two arms that can be fastened to the corner edge of solar panel frames. The bracket can also include a flange extending from the corner where the arms intersect and the flange can connect with a neighboring flange on a neighboring bracket.

In some cases, the flanges are configured to mate with a neighboring flange on a neighboring bracket simply by fastening neighboring brackets to solar panel in an upside-down orientation. The flange can take up a first one-half of the height of the bracket, thereby allowing the flange to mate another flange on a neighboring bracket in an upside-down orientation. The flange can also take up a first one-quarter and a third-one quarter of the height of the bracket, thereby allowing the flange to mate another flange on a neighboring bracket in an upside-down orientation. The flange can also take up a second one-third of the height of the bracket thereby allowing the flange to mate with an additional bracket with a flange that can take up a first one-third and a third one-third of the height of the second bracket, thereby allowing the flange of the first bracket to mate between the two flanges of the second bracket.

In some embodiments, the flanges also include an aperture that align with a neighboring aperture, such that a pin can secure the neighboring solar panels In some embodiments, the bracket includes surface features and underside features such the bracket can nest with other stacked brackets, thereby allowing solar panels using the corner brackets to be securely stacked. Likewise, a packing rod can be placed through the aligned bracket apertures in a stack of nesting solar panels.

The corner connection bracket of the present technology can also be installed within a frame chamber of solar panel frame members, thereby joining the frame members and creating a corner of a solar panel frame.

Some embodiments of the present technology involve using solar panel connection assemblies to support frameless solar panels and secure neighboring connection assemblies together. In some cases, the connection assemblies include a pair of subassemblies with reverse-oriented configurations to allow mating between neighboring solar panels. The subassemblies can include a plate to provide structural support to the solar panel and a flange extending from the subassembly for coupling with a reverse-oriented flange of a neighboring subassembly.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for solar panel connection assemblies that avoid installation that requires a large amount of time and excessive amounts of material and that are stackable.

The present technology involves corner connection brackets for solar energy panels that provide a structural mounting point to connect the solar energy panel to another solar energy panel. For example, one corner connection bracket can be installed on each of the four corners of a solar energy panel. A wide variety of corner connection brackets can be used to accomplish the various advantages of the disclosed technology, as explained in greater detail below.

The corner connection brackets can be installed on solar panels in a wide variety of ways. For example, the corner connection brackets can be installed outside of a frame of a solar energy panel, within a cavity of the frame, on the inside of the frame, mechanically or adhesively connected directly to the solar energy glass or back sheet, or any combination thereof.

The corner connection brackets of the present technology are installed to the solar energy panel with minimal to no change in the current assembly method and/or current designs of frames or laminates (i.e. glass and solar cells) of the solar energy panels. The corner connection brackets are strong enough to transfer loads from one or more adjacent solar energy panels to a first solar energy panel support in use. The disclosed corner connection brackets and the frames of the solar energy panels provide the necessary structural support to mount the solar energy panels to a structure or building rooftop. In some cases, the corner connection brackets themselves are used as a structural element to directly mount one or more solar energy panels to a structure or building rooftop.

Figure 1A:
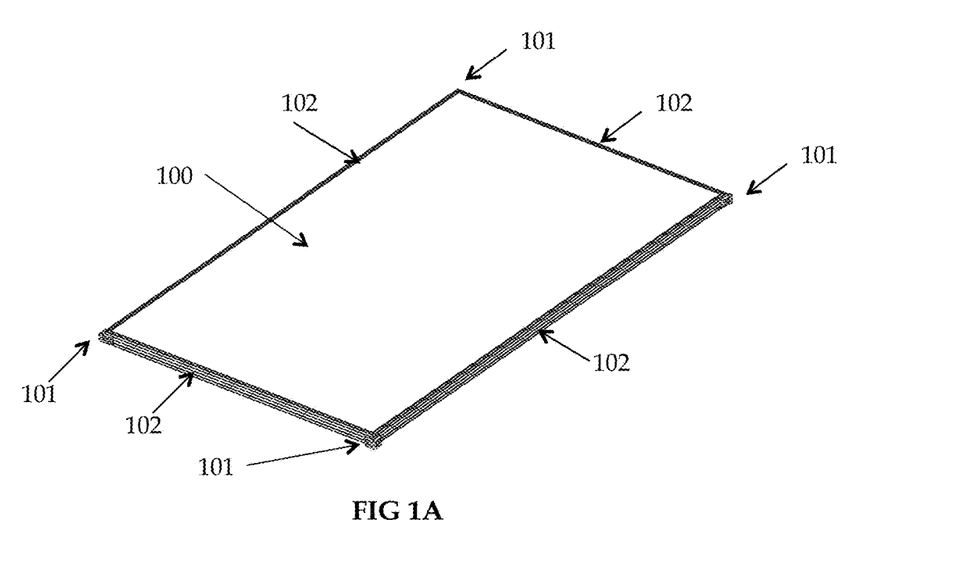
FIGS. 1A and 1B show exemplary isometric views of a solar energy panel with a corner connection bracket installed according to some embodiments of the present technology.
Figure 1B:
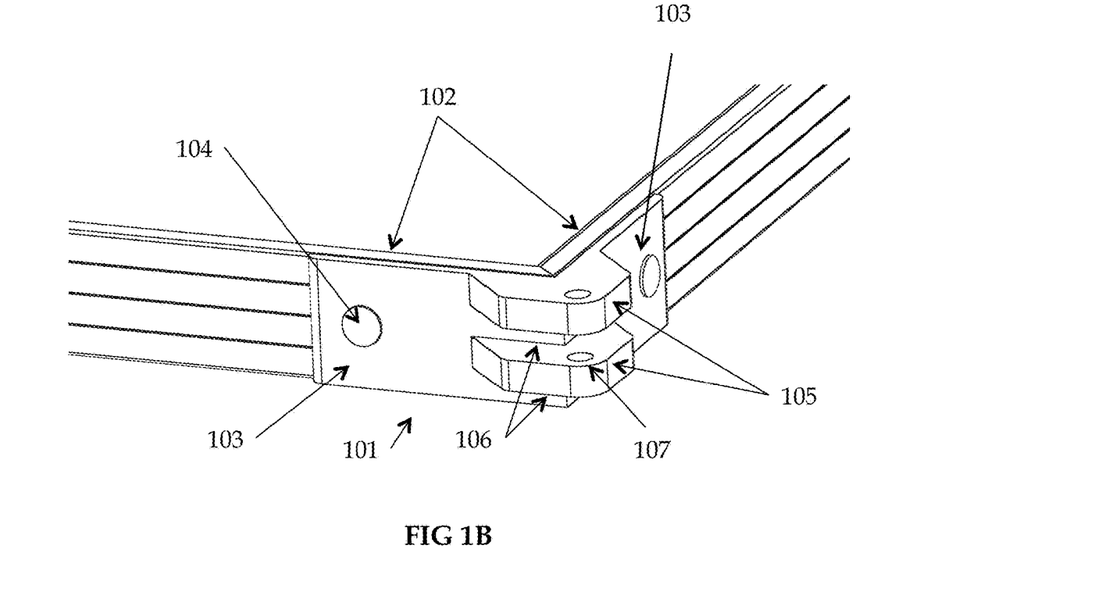

FIGS. 1A and 1B show exemplary isometric views of a solar energy panel with a corner connection bracket installed according to some embodiments of the present technology. FIG. 1A illustrates a solar energy panel 100 with corner connection brackets 101 installed on solar panel frame members 102 at all four corners of solar energy panel 100. The corner connection brackets 101 are coupled to the solar energy panel 100 such that corner connection brackets on adjacent solar energy panels mate with corner connection brackets 101 of the first solar energy panel 100. For example, one diagonal pair of corner connection brackets 101 are coupled with the solar energy panel 100 in a first orientation and a second diagonal pair of corner connection brackets 101 are coupled with the solar energy panel 100 in a second orientation complimentary to (e.g. up-side down) of the first pair.

FIG. 1B is an enlarged view of corner connection bracket 101 installed on the solar energy panel 100. Corner connection bracket 101 has arms 103 that protrude along the external face of solar panel frame members 102 of solar energy panel 100. The arms 103 can be disposed at a substantially right angle to one another and can have equal or unequal lengths along solar panel frame members 102. Also, the arms 103 can have the same or substantially the same vertical height of solar panel frame member 102.

The corner connection bracket 101 may connect to a solar panel frame member 102 with fasteners 104. For example, there can be one or more fasteners 104 on each arm 103 to securely connect corner connection bracket 101 to the solar panel frame member 102 and to secure the solar energy panel 100.

In some embodiments, the corner connection bracket includes one or more protruding flange extending away from outside corner of bracket that is configured to mate with a neighboring flange. In some cases, the flanges are designed such that a first corner connection bracket in one orientation would seat within the flanges of a second corner connection bracket in a second orientation, e.g. an upside-down orientation.

The corner connection bracket 101 of FIG. 1B includes two protruding flanges 105 with an aperture 107 extending through both flanges 105 to accept a rotatable fastener, as explained in more detail below.

The thickness of each flange 105 and flange void 106 is designed such that the flanges and flange voids of a second corner connection bracket with an upside-down orientation would mate with a first corner connection bracket 101. For example, as shown, the flange 105 is configured on a first one-quarter of the height of the arms 103 and on a third one-quarter of the height of the arms, thereby allowing the to mate with a neighboring similarly configured flanges in an upside-down orientation. Likewise, the solar energy panel 100 of FIG. 1 can have corner connection brackets 101 installed on all four corners and the first pair of diagonal corner connection brackets 101 can have similarly oriented flanges 105 and flange voids 106 and the second pair of diagonal corner connection brackets 101 can have upside-down oriented flanges 105 and flange voids 106.

As explained above, the flanges 105 can include an aperture 107 configured such that the apertures of adjacent flanges align to accept and be securely held together with a fastener, such as a bolt, screw, pin, or similar device. The apertures can be substantially cylindrical in shape, substantially conical in shape, or substantially rectangular in shape. The apertures can be partially threaded to accept a screw thread, or may be substantially smooth, and may accept a standard size fastener. The apertures in the corner connection brackets can be used to attach accessories, such as a micro-inverter, electrical grounding lug, weather meter, spare parts, wire management clips, or similar. The apertures can also act as alignment guide during installation of the corner connection brackets onto a solar energy panel and can act as a lift or hoist point for transporting, lifting, and moving solar energy panels from one location to a different location.

The flanges can also be designed to protrude from the corner connection bracket at an angle sufficient to allow a pair of solar panels, coupled using the corner connection brackets, to rotate in a wide arc with respect to the other solar panel. For example, the flanges can include an aperture for allowing rotatable connection between two solar panels and the flanges may be disposed at a particular (e.g. 135°) angle with respect to the sides of the solar panel, thereby allowing a second solar panel to rotate from substantially 180-degrees to a second position.

For example, the flanges 105 in FIG. 1B are symmetrical in shape along about as axis formed and extending from the connection point, where the axis is 135° from the side of the solar panel frame 102. In some embodiments not shown, a backing plate, washers, or similar load spreading device may be used on the inside of the frame 102.

Figure 2A:
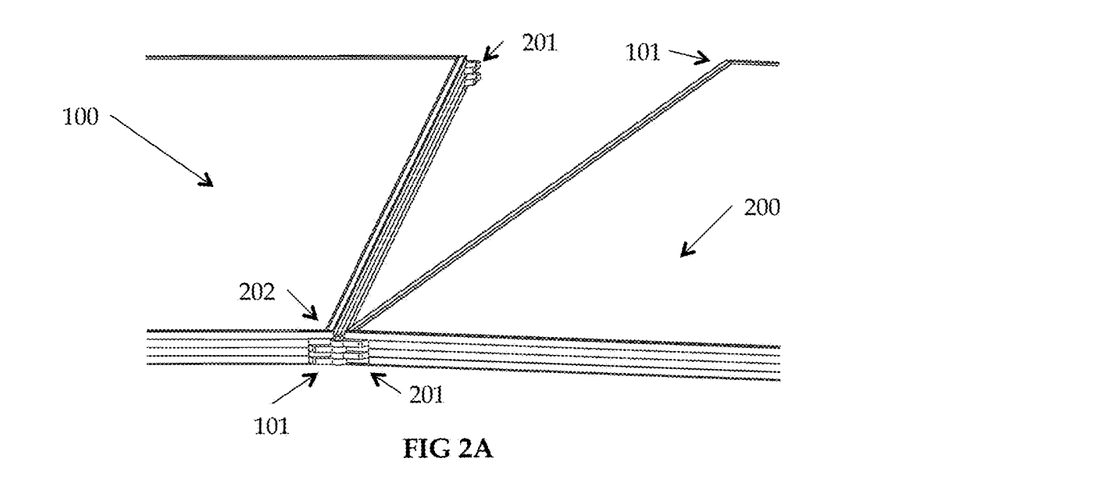
FIGS. 2A and 2B show isometric views illustrating two solar energy panels joined by a corner connection according to some embodiments of the present technology.
Figure 2B:
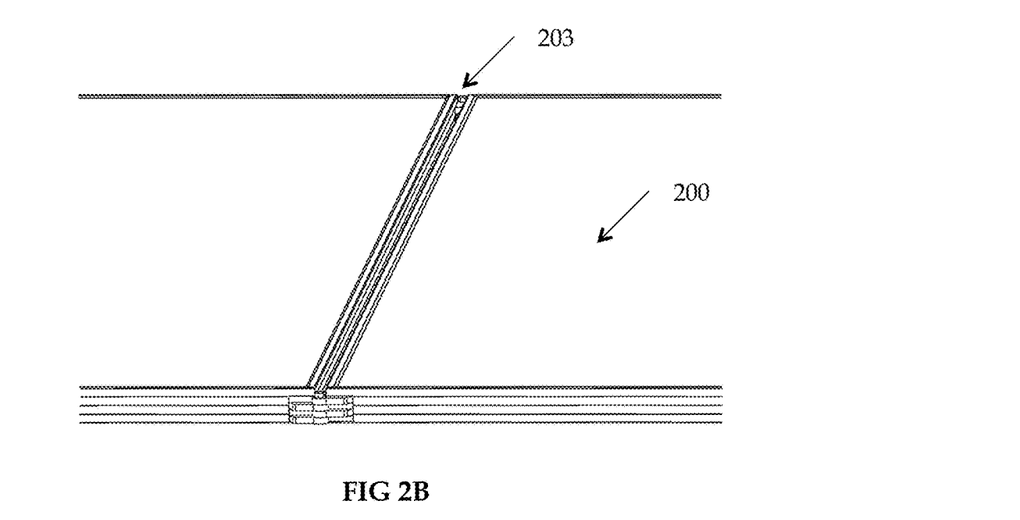

FIGS. 2A and 2B are exemplary isometric views of neighboring solar panels with corner connection brackets being connected according to some embodiments of the present technology. In FIG. 2A, a first corner connection bracket 101 installed on first solar energy panel 100 and second corner connection bracket 201 installed on second solar energy panel 200 have opposite orientations, where first corner connection bracket 101 is upside-down, and the second corner connection 201 bracket is right-side-up. This difference in orientations allows for the flanges of the first corner connection bracket 101 to seat within the flange voids of second corner connection bracket 201 while maintaining the same elevation of first solar energy panel 100 relative to second solar energy panel 200. A hinge bolt 202 secures first corner connection bracket 101 to second corner connection bracket 201, thereby securing first solar energy panel 100 and second solar energy panel 200 together at the lower corner as shown.

The hinge bolt 202 also acts as an axis of rotation for second solar energy panel 200 relative to first solar energy panel 100, thereby allowing first corner connection bracket 101 and second corner connection bracket 201 to be aligned and hinge bolt 202 to be installed before having to align any subsequent edges or corners of first solar energy panel 100 and second solar energy panel 200.

The corner connection brackets at the top of both solar energy panels have opposite orientations relative to corner connection brackets on the lower corners of their respective solar energy panels. FIG. 2B the solar energy panels 100, 200 connected. Second hinge bolt 203 is installed in the aligned apertures of the upper corner connection brackets, thereby securing solar energy panel 100 and solar energy panel 200.

According to various embodiments of the present technology, the corner connection brackets can be coupled to solar panels and solar panel frames in a vide variety of ways. For example, FIGS. 1A and 1B illustrate corner connection brackets affixed to the outside of a solar panel frame member using fasteners. FIGS. 3-6 illustrate additional coupling configurations according to some embodiments of the present technology.

Figure 3A:
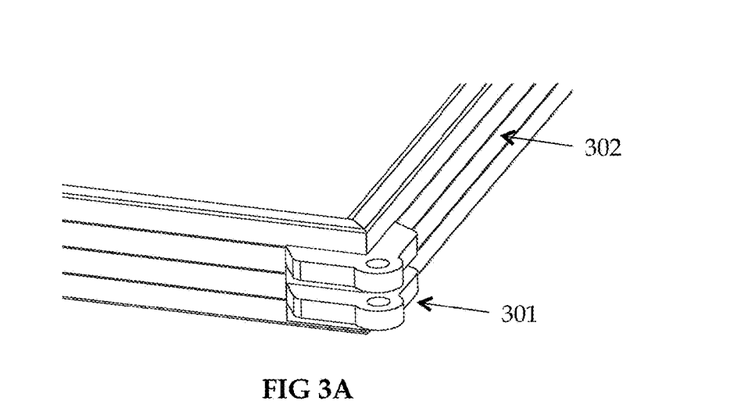
FIGS. 3A, 3B, and 3C are isometric views of a corner connection bracket connected within the frame chambers of solar energy panel frame members according to some embodiments of the present technology.
Figure 3B:
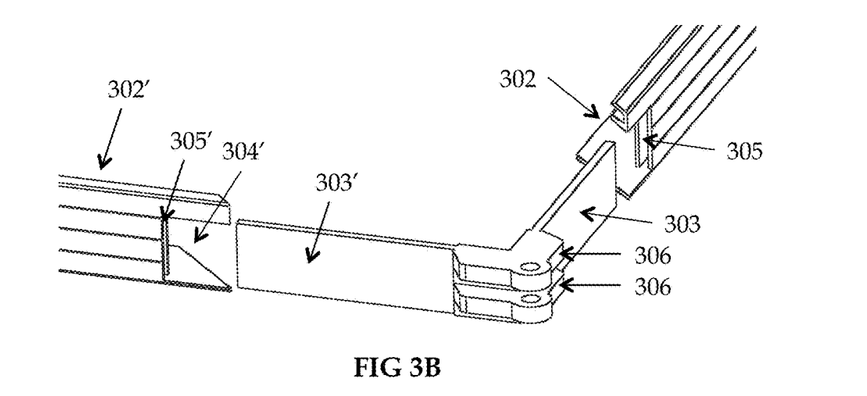

FIG. 3A is an isometric view and FIG. 3B is an exploded view of a corner connection bracket 301 installed within the frame chamber 305 of solar panel frame members 302, 302' according to some embodiments of the present technology. The frame members 302 have a frame chamber 305 and the arms 303 of the corner connection bracket 301 fit within frame chamber 305. The corner connection bracket 301 can have first arm 303 and second arm 303' that are each configured to fit within in frame chambers 305, 305' of the frame members 302, 302', thereby joining the frame members and creating a corner of a solar panel frame.

Figure 3C:
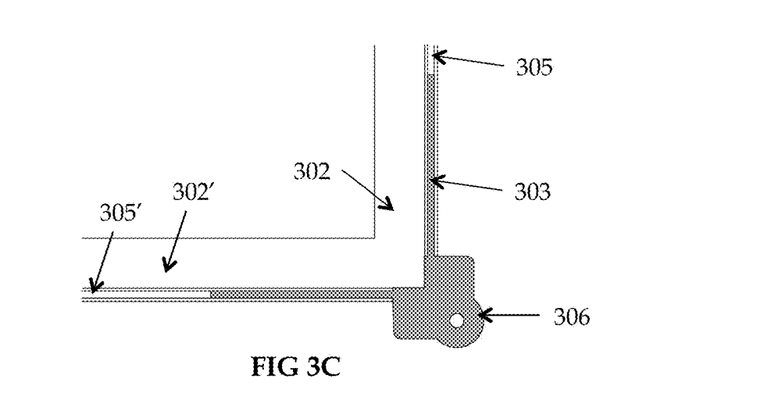

The arms 303 may substantially snugly fit, or may substantially loosely fit within frame chamber 303. The corner connection bracket 101 may be secured to frame 302 with one or more fasteners, a press fit, a swedge, welded, glued, bonded, or some other suitable securement method. Additionally, a notch 304 in the frame 302 accommodates the form factor of the flanges 306 and allows the flanges 306 to protrude outside the outer surface of frame 302 members when the arms 303 are inserted into the frame chambers 305. FIG. 3C illustrates a cut-away top down view of FIG. 3A showing corner connection bracket 301 is installed within the frame chambers 305 of the frame members 302.

Figure 4:
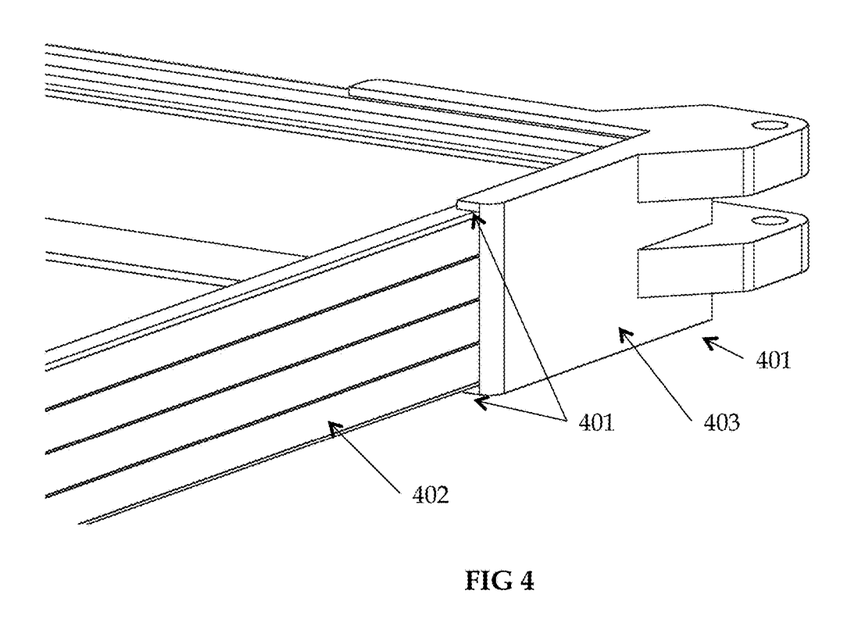
FIG. 4 is a perspective view of a corner connection bracket with flanges externally grasping the frame of a solar energy panel according to some embodiments of the present technology.

FIG. 4 depicts an exemplary corner connection bracket 401 that coupled with a solar panel frame by exteriorly coinciding the solar panel frame members 102. The corner connection bracket 401 can have channel flanges 401 protruding horizontally from arms 403. Additionally, the channel flanges 401 can be configured to exteriorly brace corner connection bracket 401 to the frame member 402 and thereby assist in transferring forces incurred on the solar energy panel to the corner connection bracket 401. The channel flanges 401 may be on the top, the bottom, or both top and bottom edges of corner connection bracket 401, may be on one or both arms 403, or any combination thereof. The channel flanges 401 may extend beyond the width of the frame member 402 over the glass surface of the solar energy panel, may extend to the width of the frame member 402, or extend within the width of the frame member 402. Additionally, the corner connection 401 may be secured to the frame member 402 at arms 403, or at channel extensions 401, or both, with a suitable securement method such as screws, bolts, glue, welds, snaps, pins, etc.

Figure 5:
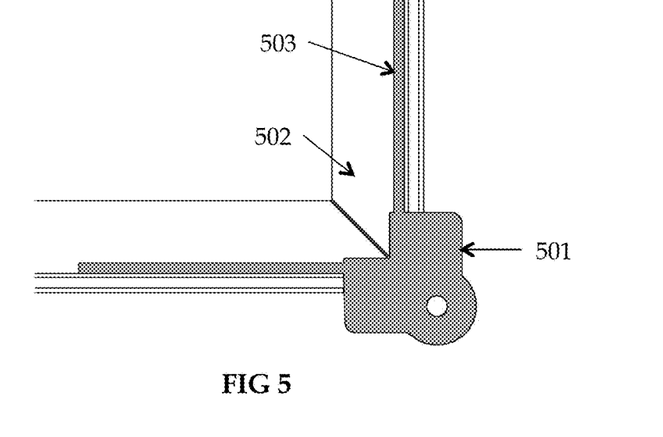
FIG. 5 is a top down view of a corner connection bracket mounted on the inside of the frame of a solar energy panel according to some embodiments of the present technology.

FIG. 5 illustrates another corner connection bracket 501 configured to be installed on the inside perimeter of a frame member 502 according to some embodiments of the present technology. In the configuration illustrated in FIG. 5, arms 503 are mounted inside of the perimeter of the frame member 502. The corner connection bracket 501 may be fastened to the frame member 502 with in a variety of ways such as screws, bolts, glue, welds, snaps, pins, etc.

Some embodiments of the present technology involve using solar panel connection assemblies to support frameless solar panels and secure neighboring connection assemblies together. In some cases, the connection assemblies include a pair of subassemblies with reverse-oriented configurations to allow mating between neighboring solar panels. The subassemblies can include a plate to provide structural support to the solar panel and a flange extending from the subassembly for coupling with a reverse-oriented flange of a neighboring subassembly.

Flanges can be supported by a flange bracket coupled with the plate and can be offset from the plate by a degree substantially equal to the thickness of a solar panel, thereby allowing the corner of a solar panel to nest on the plate and be supported the flange bracket.

A flange can be configured on a first one-half of the height of a flange bracket and a neighboring flange can be disposed in a second one-half of the height of a paired flange bracket, thereby allowing the flanges to mate when the corners of neighboring solar panels are brought together.

Similarly, in a first subassembly, a first flange can be configured on a first one-quarter of the height of a flange bracket and a second flange is configured on a third one-quarter of the height of the flange bracket. In the in a neighboring subassembly, a first paired flange can be configured on a third one-quarter of the height of a paired flange bracket and a second paired flange is configured on a fourth one-quarter of the height of the paired flange bracket, thereby allowing the flanges to mate when the corners of neighboring solar panels are brought together.

In some other embodiments, the flange can also take up a second one-third of the height of the bracket thereby allowing the flange to mate with an additional bracket with a flange that can take up a first one-third and a third one-third of the height of the second bracket, thereby allowing the flange of the first bracket to mate between the two flanges of the second bracket.

Although various configurations of mating flanges are described explicitly, those with ordinary skill in the art having the benefit of this disclosure will readily appreciate that a wide variety of mating flange configurations are possible to accomplish the novel aspects of the technology.

Figure 6:
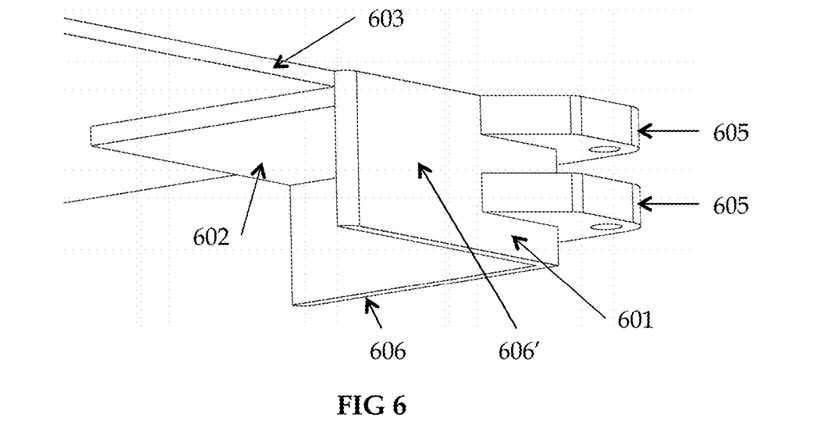
FIG. 6 is an isometric view of an exemplary corner connection bracket with a plate disposed in its inside corner for supporting a frameless solar energy panel.

FIG. 6 illustrates a sub-assembly 600 including corner connection bracket 601 with flanges 605 installed directly to a solar energy laminate 603 according to some embodiments of the present technology. The solar energy laminate 603 is typically a solar energy panel with no frame. In this example, corner connection bracket 601 has a plate 602 disposed within and connected to the inside corner of the corner connection bracket 601. The plate 602 provides a structural interface to solar energy laminate 601. For example, the plate 602 can be sized and shaped to tolerate forces between the solar energy laminate 603 to corner connection bracket 601 under normal circumstances or can be over-engineered to a heightened standard and to tolerate extreme (e.g. hurricane) conditions. The corner connection bracket 601 may be installed on solar energy laminate using adhesive, glue, tape, rubber, mechanical fasteners, etc.

The corner connection bracket 601 can include arms 606, 606' that can provide the sub-assembly extra support. The arms can be disposed at a substantially right angle and can be offset from the plate by a degree substantially equal to the thickness of a solar panel.

Additionally, the corner connection bracket 601 can have a static or dynamic clamp mechanism that grips the edge of the solar energy laminate 603. The grips can provide substantially enough surface area on the top and or bottom surfaces of the grip to sufficiently transfer forces and moments from the solar energy laminate 603 to the corner connection bracket 601.

In some embodiments, a pair of corner connection brackets 601 are configured with flanges having an opposite orientation for allowing neighboring corner connection brackets 601 to mate. Similarly, a frameless solar panel can be configured with corner connection brackets 601 with a first orientation on the first set of diagonally related corners and corner connection brackets 601 with an opposite orientation on the second set of diagonally related corners.

The corner connection brackets of the present technology provide structural support to solar panels and to adjacently connected solar panels. Additionally, the corner connection brackets can provide advantages in the installation process by allowing the solar panel frames (and solar panels in the case of frameless solar panels) to rotate to multiple positions and orientations relative to other solar panels.

Figure 7:
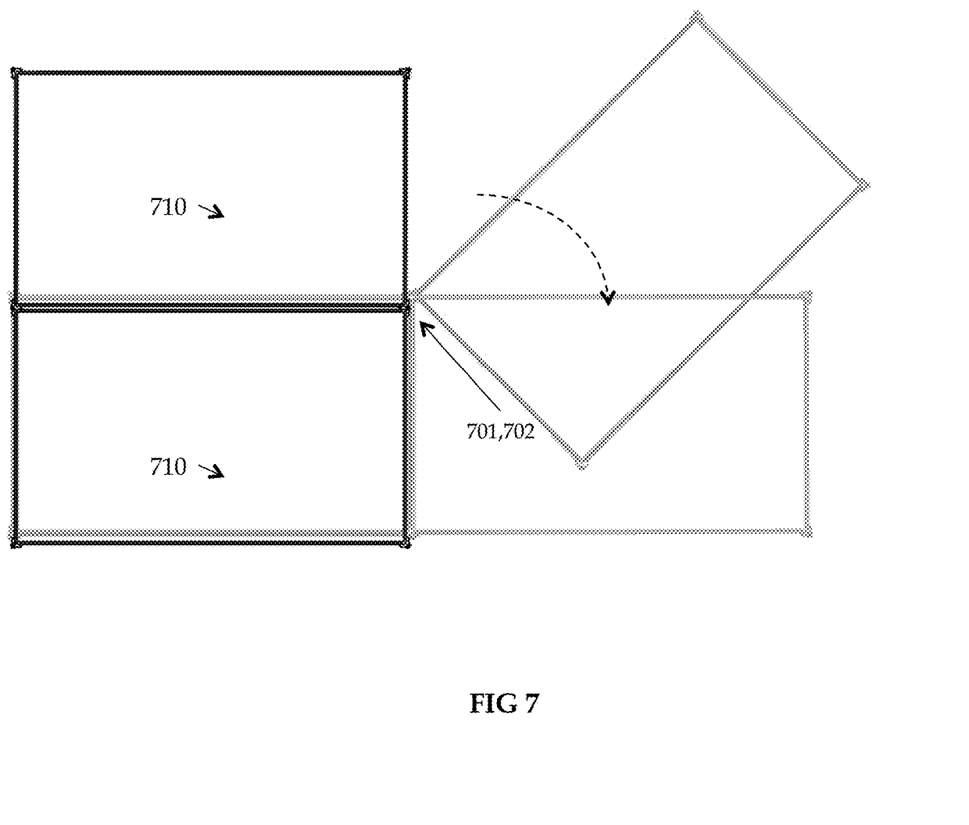
FIG. 7 is a top down view of two solar panels connected using corner brackets in various orientations according to some embodiments of the present technology.

FIG. 7 illustrates multiple solar energy panels 700, 710 connected at a corner connection bracket 701 by a hinge bolt 702. The first solar energy panel 700 is connected to a second solar energy panel 710 in a first position. The second solar energy panel 700 can rotate around hinge bolt 201 to a second position. The first orientation depicts a 'portrait' orientation with the lengths of the long edges of the solar energy panels are adjacent to one another. With the first solar energy panel 700 fixed in a first position, the second solar energy panel 710 rotates around hinge bolt 201 180-degrees to end in a second orientation. The second orientation depicts a 'landscape' orientation whereby the lengths of the short edges of the solar energy panels are adjacent to one another. In practice, the first and second solar energy panel can be connected in either 'portrait' or 'landscape' orientation using the existing installed corner connection brackets.

Figure 8:
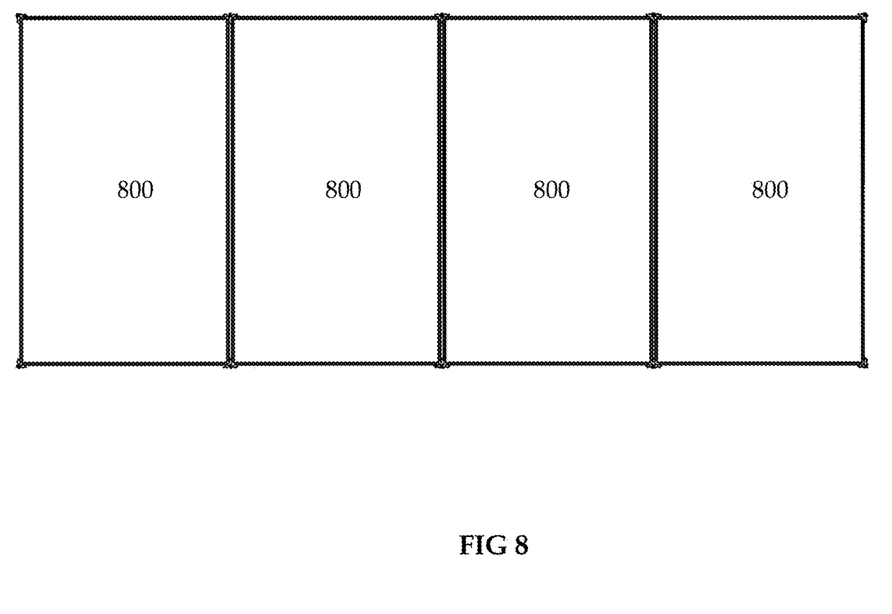
FIG. 8 is a top down view of multiple solar energy panels connected together using corner connection brackets to form a sub-array according to some embodiments of the present technology.

FIG. 8 illustrates an exemplary assembly of four solar energy panels 800 connected together in 'portrait' orientation. In other example embodiments not shown, two or more solar energy panels 800 may be connected together in 'landscape' orientation, and in some embodiments, the solar energy panels may be connected together in both 'landscape' and 'portrait' orientations. As an example method for final installation on a structure or building rooftop, two or more solar energy panels 800 can be connected together on the structure just prior to final installation to the structure. In another example, two or more solar energy panels 800 may be connected together, in a staging area near the final installation location, and wiring and micro-inverters may be installed, and a person or persons, a crane, or similar lifting technique may hoist the connected solar energy panels into position on the structure for final installation. In another example, two or more solar energy panels 800 may be connected together, at an offsite location away from the final installation site, such as a warehouse, contractor's shop, or factory, and wiring and micro-inverters may be installed, and then be transported as a single or multiple connected unit(s) to the location of final installation. In some examples, a person or persons, a crane, or similar lifting technique may hoist the connected solar energy panels into position on the structure for final installation.

Some embodiments of the present technology involve corner connector assemblies and corner connector brackets that are configured such that the solar panels and solar panel frames connected thereto are stackable for easy storage, shipment, loading, hoisting etc. For example, the corner connector assemblies and corner connector brackets can have surface features that nest with corresponding underside features of an additional flange stacked upon it. Similarly, the apertures in the corner connector bracket flanges can align when stacked, thereby allowing a packing rod to be inserted through a series of stacked corner bracket connectors.

Figure 9:
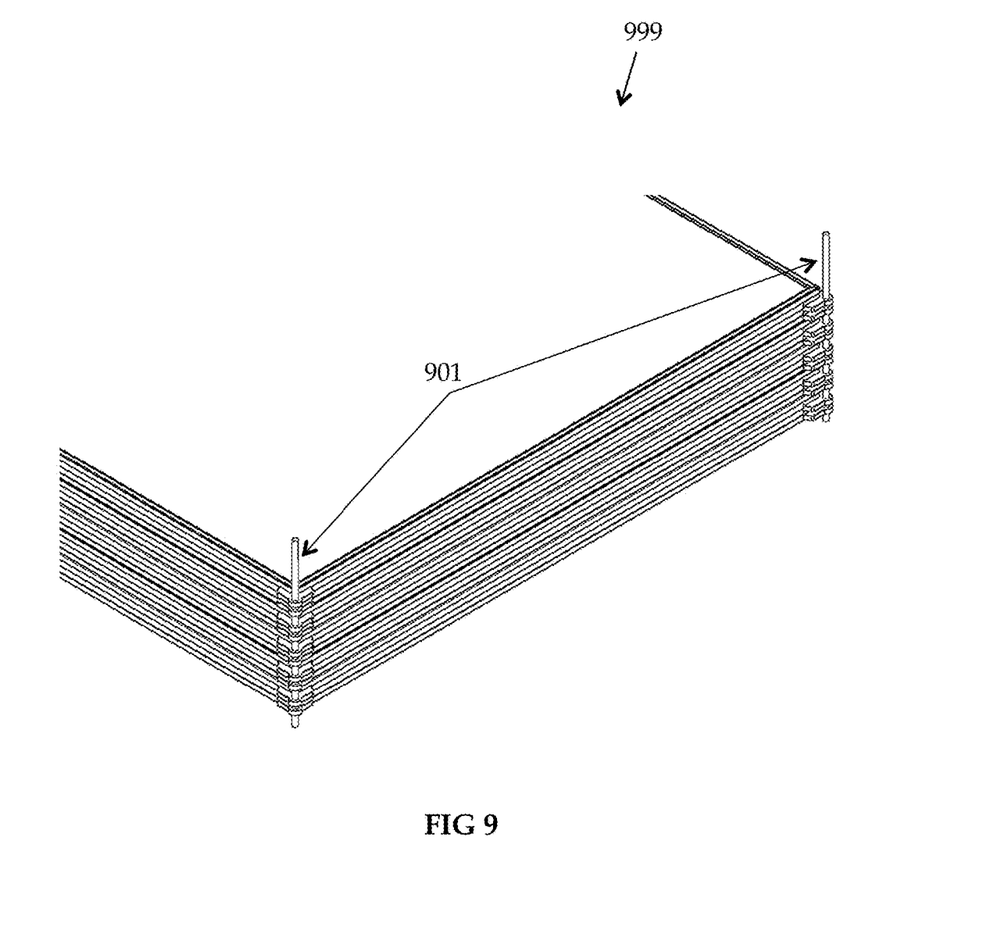
FIG. 9 is an isometric view of multiple solar energy panels stacked with an alignment rod through corner connection brackets according to some embodiments of the present technology.

FIG. 9 illustrates an exemplary system 900 for stacking and packaging multiple solar energy panels having corner connection brackets according to some embodiments of the present technology. As shown in FIG. 9, packing rods 901 are inserted into apertures of the corner connection brackets for a stack of solar energy panels having corner connection brackets with aligning apertures. Additionally, one or more packing rods 901 can be mounted to a shipping pallet, or some other rigid structure. In one example methodology of assembly, the packing rods 901 may be installed into a shipping pallet, and a first solar energy panel may be lowered onto the shipping pallet with the packing rods 901 penetrating through one or more corner connection brackets. Additional solar energy panels would be stacked onto the shipping pallet in a similar fashion until a desired quantity of solar energy panels is stacked. The top of packing rods 901 may have a string or chain connecting one another, or a flange may be secured to the top of one or more packing rods 901 in order to prevent the solar energy panels from coming off the top of the packing rods 901.

As mentioned above, a wide variety of corner connection brackets can be used to accomplish the various advantages of the disclosed technology. Various corner connection bracket can have various dimensions, nesting features, flange configurations, etc. For example, the flanges can have surfaces substantially parallel to the plane of the solar energy panel, or the flanges may have surfaces set at some angle relative to the horizontal. In some cases, the flanges may be shaped such that when compressed together orthogonally relative to solar energy panel, adjacent corner connection brackets and their respective solar energy panels are drawn together. In some embodiments, the flanges may be horizontally and/or vertically oriented.

Figure 10A:
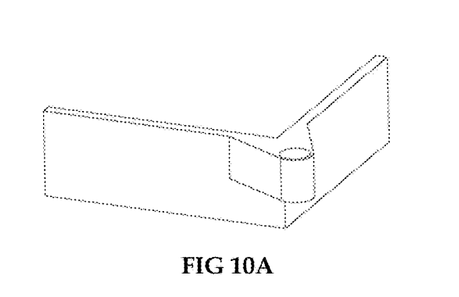
FIGS. 10A through 10H are isometric views of exemplary corner connection brackets.
Figure 10B:
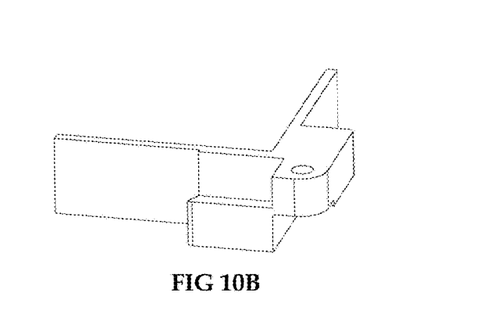

FIGS. 10A-10H illustrate various corner connection brackets according to some embodiments of the present technology. FIG. 10A illustrates an exemplary corner connection bracket with one flange protruding from the bracket at a substantially 45-degree angle relative to the intersection of the arms. In this example, the aperture is centered on the flange and is cylindrical or conical to receive a cylindrically or conically shaped fastener, such as a bolt. FIG. 10B illustrates another exemplary corner connection bracket with a flange and with each arm having an oppositely oriented dovetail protrusion. The dove-tail protrusions act to pull together adjacent solar energy panels when a bolt is tightened through the aperture in the flange. The dove-tail protrusions are oppositely oriented so that a single part can be manufactured, and be installed in opposite vertical orientations to allow for proper connection between solar energy panels.

Figure 10C:
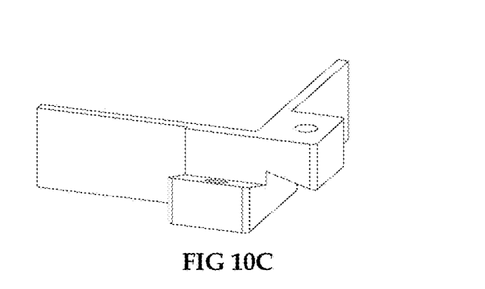

FIG. 10C illustrates another example of a corner connection bracket with oppositely oriented dove-tail protrusions on each arm. In FIG. 10C, apertures are provided in each dove-tail protrusion in order to accept a fastener, such as a bolt, that will connect adjacent solar energy panels together.

Figure 10D:
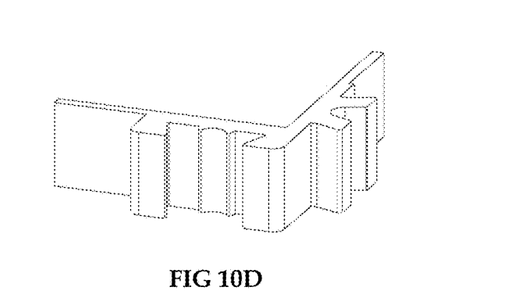

FIG. 10D depicts a corner connection bracket with one arm having a male symmetrical dove-tail protrusion in a vertical orientation and a second arm having an equivalent female symmetrical dove-tail protrusion in a vertical orientation. In this example, each dove-tail protrusion has a substantially cylindrical face that when the male dove-tail protrusion of one corner connection bracket is mated with the female dove-tail protrusion of a second corner connection bracket, the substantially cylindrical faces of each form to create a substantially cylindrical aperture. A fastener, such as a bolt, screw, pin, etc., can be installed into this substantially cylindrical aperture and press the corner connection brackets apart from one-another, thereby compressing the male and female dove-tail protrusions together and creating a rigid connection between the solar energy panels.

Figure 10E:
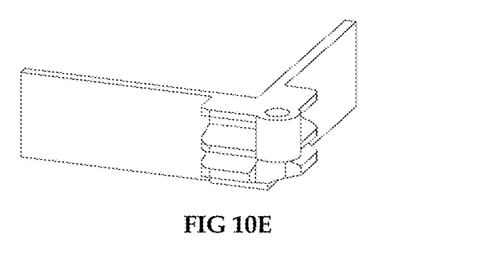

FIG. 10E illustrates a further exemplary embodiment of a corner connection bracket with each arm having protrusions with trapezoidal or nearly trapezoidal grooves. In this example, the trapezoidal grooves of a first corner connection bracket would seat within the trapezoidal protrusions of a second corner connection bracket with an up-side-down orientation.

Figure 10F:
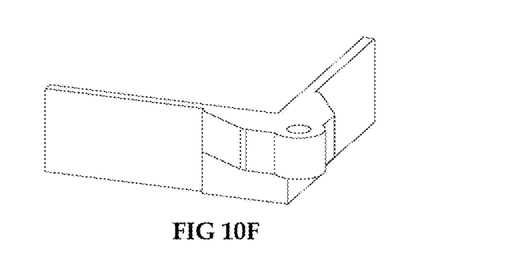

FIG. 10F illustrates a further exemplary embodiment of a corner connection bracket with a buttressed profile to transfer more force from the aperture to the arms. In this example, there may be one flange, or multiple flanges (not shown).

Figure 10G:
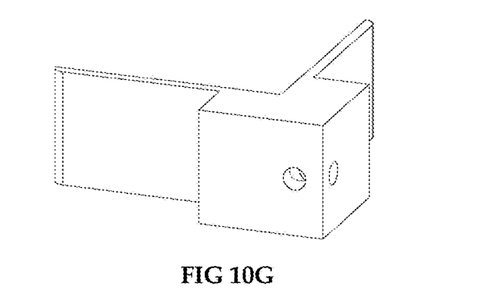

FIG. 10G illustrates a corner connection bracket whereby the flange having two or more flat vertical surfaces that each may have one of more apertures extending through parallel to each arm in the horizontal. In this example a flat surface of a first and second corner connection bracket would be aligned along the respective apertures, and a fastener such as a bolt, screw, pin, etc. may be placed through the aligned apertures. When the fastener is tightened down, the two vertical surfaces of the first and second corner connection brackets would compress and provide a rigid connection between a first and second solar energy panel.

Figure 10H:
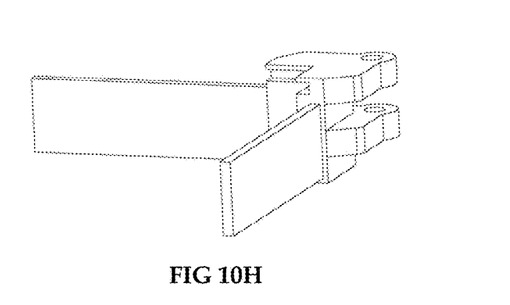

FIG. 10H depicts another exemplary embodiment of a corner connection bracket whereby one or more flanges may have a total height greater than the height of one or both of the arms. In this example, the additional height of the flanges may provide additional strength when a first and a second corner connection bracket are connected.

The corner connection brackets of the present technology can be manufactured out of a metal, such as aluminum or stainless steel, or out of a composite material, such as fiberglass, fiber reinforced plastic, other composites, etc. In some embodiments, the corner connection brackets may be manufactured using an extrusion process and may have subsequent milling operations in to create any necessary grooves, apertures, flanges, etc.

In some cases, the corner connection piece may act as an electrical grounding path between solar energy panels and other accessories, thereby eliminating the need for an installed array of solar energy panels to have a grounding wire installed and reducing overall installation time and reducing material costs for the solar array.

Some embodiments of the present technology involve assembling an array of solar energy panel array by using the corner connection brackets with two or more solar energy panels prior to final installation on a structure or building rooftop. In some cases, two or more solar energy panels may be connected together on a building rooftop, in a staging area on the ground near the building rooftop, or at an offsite location, all prior to final installation, thereby allowing for the work to prepare the building rooftop and the work of connecting and wiring some or all of the solar energy panels to occur in parallel. In some cases, two or more solar energy panels may be connected and wired together into a sub-array and hoisted or lifted as a single unit onto the building rooftop or structure.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A solar panel connection assembly comprising:
   a bracket having a first arm and a second arm, the first arm and the second arm disposed at a substantially right angle to each other; and
   a first flange configured within a first one-half of the height of the intersection of the first arm and the second arm, the first flange extending away from the bracket substantially at an outside corner of the bracket in a direction that bisects and is opposite the right angle between the first arm and the second arm, wherein the first flange is configured to mate with a neighboring similarly-configured flange on an neighboring bracket in an upside-down orientation.

2. The solar panel connection assembly of claim 1, wherein the first flange further includes an aperture disposed in a direction orthogonal to a plane defined by the first arm and second arm, wherein the aperture is configured to align with a neighboring aperture on a neighboring similarly-configured flange on an neighboring bracket in an upside-down orientation.

3. The solar panel connection assembly of claim 2, further comprising:

a pin configured to be installed in the aperture and neighboring aperture when the first flange is mated with a neighboring similarly-configured flange.

4. The solar panel connection assembly of claim 1, wherein the first arm and second arm are each configured to align with a respective corner edge of a solar panel frame.

5. The solar panel connection assembly of claim 1, wherein the first arm and second arm each include at least one fastener hole disposed therein.

6. The solar panel connection assembly of claim 5, wherein the at least one fastener hole disposed in the first arm and second arm are configured to accept a threaded fastener.

7. The solar panel connection assembly of claim 1, wherein mating first flange with a second flange creates an electrical bonding path.

8. The solar panel connection assembly of claim 1, wherein the first arm is configured to fit within a first frame chamber of a first frame member and the second arm is configured to fit within a second frame chamber of a second frame member, thereby joining the first frame member and second frame member and creating a corner of a solar panel frame.

9. The solar panel connection assembly of claim 1, further comprising:
a second flange having substantially the same shape as the first flange and extending from the bracket in substantially the same orientation,
wherein the first flange is configured within a first one-quarter of the height of the intersection of the first arm and the second arm and the second flange is configured within a third one-quarter of the of the height of the intersection of the first arm and the second arm, thereby allowing the first flange and the second flange to mate with a pair of neighboring similarly-configured flanges on a neighboring bracket in an upside-down orientation.

10. The solar panel connection assembly of claim 1, wherein the bracket further comprises surface features and underside features such that the underside features of a bracket nests in the surface features of an additional bracket stacked upon the bracket.

11. A solar panel connection assembly comprising:
a first frameless solar panel connection subassembly comprising:
a first plate configured to provide structural support to a first corner of a first solar panel, two adjoining edges of the first plate forming a substantially right angle corner; and
a first flange bracket coupled with the first plate and including a first flange configured within a first one-half of the height of the first flange bracket, the first flange extending away from an outside corner of the first plate in a direction that bisects and is opposite the right angle corner formed by the two adjoining edges; and
a second frameless solar panel connection subassembly comprising:
a second plate configured to provide structural support to a second corner of a second solar panel; and
a second flange bracket coupled with the second plate and including a second flange extending from an outside corner of the second plate,
wherein the first flange and the second flange are configured to mate when the corners of the first solar panel and the second solar panel are brought together.

12. The solar panel connection assembly of claim 11, wherein the second flange is configured within a second one-half of the height of the second flange bracket, thereby allowing the first flange and the second flange to mate when the corners of the first solar panel and second solar panel are brought together.

13. The solar panel connection assembly of claim 11,
wherein the first flange bracket further includes a third flange, wherein the first flange is configured within a first one-quarter of the height of the first flange bracket and the third flange is configured within a third one-quarter of the height of the first flange bracket,
wherein the second flange bracket further includes a fourth flange, wherein the second flange is configured within a second one-quarter of the height of the second flange bracket and the fourth flange is configured within a fourth one-quarter of the height of the second flange bracket, thereby allowing the first flange and the second flange to mate when the corners of the first solar panel and the second solar panel are brought together.

14. The solar panel connection assembly of claim 11, wherein the first flange further comprises an aperture disposed in a direction orthogonal to a plane defined by the first plate, wherein the second flange further comprises an paired aperture disposed in a direction orthogonal to a plane defined by the second plate, and wherein the aperture and paired aperture align when the corners of the first solar panel and the second solar panel are brought together.

15. The solar panel connection assembly of claim 14, further comprising:
a pin configured to be installed in the aperture and paired aperture when the corners of the first solar panel and the second solar panel are brought together.

16. The solar panel connection assembly of claim 11, wherein the first plate and the second plate are offset within the first flange bracket and second flange bracket respectively, by a distance substantially equal to a thickness of a solar panel.

* * * * *